United States Patent [19]
Gustafson

[11] Patent Number: 5,848,837
[45] Date of Patent: *Dec. 15, 1998

[54] INTEGRALLY FORMED LINEAR LIGHT STRIP WITH LIGHT EMITTING DIODES

[75] Inventor: Thomas L. Gustafson, Southfield, Mich.

[73] Assignee: StanTech, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 707,212

[22] Filed: Sep. 3, 1996

Related U.S. Application Data

[63] Continuation-in-part of Ser. No. 520,237, Aug. 28, 1995.
[51] Int. Cl.$^6$ .............................. F21V 1/00; H01R 33/00
[52] U.S. Cl. .......................... 362/235; 362/226; 362/240; 362/800
[58] Field of Search ..................................... 362/103, 240, 362/800, 226, 235

[56] References Cited

U.S. PATENT DOCUMENTS

| | | |
|---|---|---|
| 3,463,913 | 8/1969 | Shavalier . |
| 3,996,556 | 12/1976 | Eigenmann . |
| 4,347,499 | 8/1982 | Burkman, Sr. et al. . |
| 4,376,966 | 3/1983 | Tieszen . |
| 4,396,972 | 8/1983 | Kaneko et al. . |
| 4,439,818 | 3/1984 | Scheib ..................................... 362/800 |
| 4,471,412 | 9/1984 | Mori . |
| 4,581,687 | 4/1986 | Nakanishi . |
| 4,597,033 | 6/1986 | Meggs et al. . |
| 4,761,720 | 8/1988 | Solow ..................................... 362/800 |
| 4,774,434 | 9/1988 | Bennion ................................. 362/103 |
| 4,860,182 | 8/1989 | Vadseth . |
| 4,954,931 | 9/1990 | Hassler, Jr. .............................. 362/800 |
| 4,999,755 | 3/1991 | Lin .......................................... 362/800 |
| 5,032,960 | 7/1991 | Katoh ..................................... 362/800 |

(List continued on next page.)

OTHER PUBLICATIONS

A Better Way to Save Lives!—Path Marking System From Sure–Lites, ADV950022, 38 pgs. No date.
Sure–Lites Parts Brochure—ADV940089, ADV940090, ADV940091, ADV940092, ADV940093, ADV90094, ADV90095, ADV940098; 8 pgs. No date.
LifeWay Path Marking System, Sure–Lites, products catalog, 6 pgs (1995) no month.
Elastomeric Selection Guide, Elastomeric Techonologies Incorporated, Hatboro, PA 2 pgs (©1992) No Month.
High Power Automotive LED, Technical Data, 7 pgs Copyright ©1994 Hewlett Packard Co. No Month.

*Primary Examiner*—Sandra L. O'Shea
*Assistant Examiner*—Matthew J. Spark
*Attorney, Agent, or Firm*—Harness, Dickey & Pierce, P.L.C.

[57] ABSTRACT

An integrally formed single piece light strip having no internal voids, comprising first and second bus elements spaced apart from one another by a predetermined distance for operative connection to a power source. A substrate strip includes a top surface and a bottom surface having a printed circuit thereon. At least one light emitting diode (LED), including electrical contact prongs, is provided, with the LED being mounted on the top surface of the substrate strip, and with the electrical contact prongs contacting the printed circuit on the bottom surface of the substrate strip. The printed circuit is in electrical contact with the bus elements to conduct electricity thereon. An extruded plastic material completely encapsulates the first and second bus elements, with the substrate strip and the LED to thereby provide a protective barrier and thereby make the light strip impervious to moisture. Alternatively, an integrally formed light strip is provided that includes a plastic material extruded over first and second bus elements, a substrate strip including a printed circuit and at least one LED mounted thereon to completely encapsulate the components to provide a light strip protective barrier, with the extruded plastic material being extruded to form a bottom surface defining a channel therein for facilitating connection of the strip with other like strips through a channel engaging electrical connector.

7 Claims, 8 Drawing Sheets

U.S. PATENT DOCUMENTS

| | | | |
|---|---|---|---|
| 5,107,408 | 4/1992 | Vernondier | 362/800 |
| 5,130,909 | 7/1992 | Gross . | |
| 5,155,669 | 10/1992 | Yamuro | 362/800 |
| 5,162,696 | 11/1992 | Goodrich | 362/800 |
| 5,193,895 | 3/1993 | Naruke et al. | 362/800 |
| 5,222,799 | 6/1993 | Sears et al. | 362/800 |
| 5,321,593 | 6/1994 | Moates | 362/800 |
| 5,335,151 | 8/1994 | Dahlberg . | |
| 5,336,345 | 8/1994 | Gustafson et al. . | |
| 5,337,225 | 8/1994 | Brookman | 362/800 |
| 5,371,657 | 12/1994 | Wiscombe . | |
| 5,390,090 | 2/1995 | Nau . | |
| 5,404,282 | 4/1995 | Klinke et al. | 362/800 |
| 5,414,293 | 5/1995 | Broom . | |
| 5,414,603 | 5/1995 | Conway . | |
| 5,418,384 | 5/1995 | Yamana et al. . | |
| 5,450,301 | 9/1995 | Waltz et al. | 362/800 |
| 5,490,049 | 2/1996 | Montalan et al. | 362/240 |
| 5,519,596 | 5/1996 | Woolverton | 362/800 |
| 5,559,681 | 9/1996 | Duarte | 362/800 |
| 5,661,374 | 8/1997 | Cassidy et al. | 362/800 |

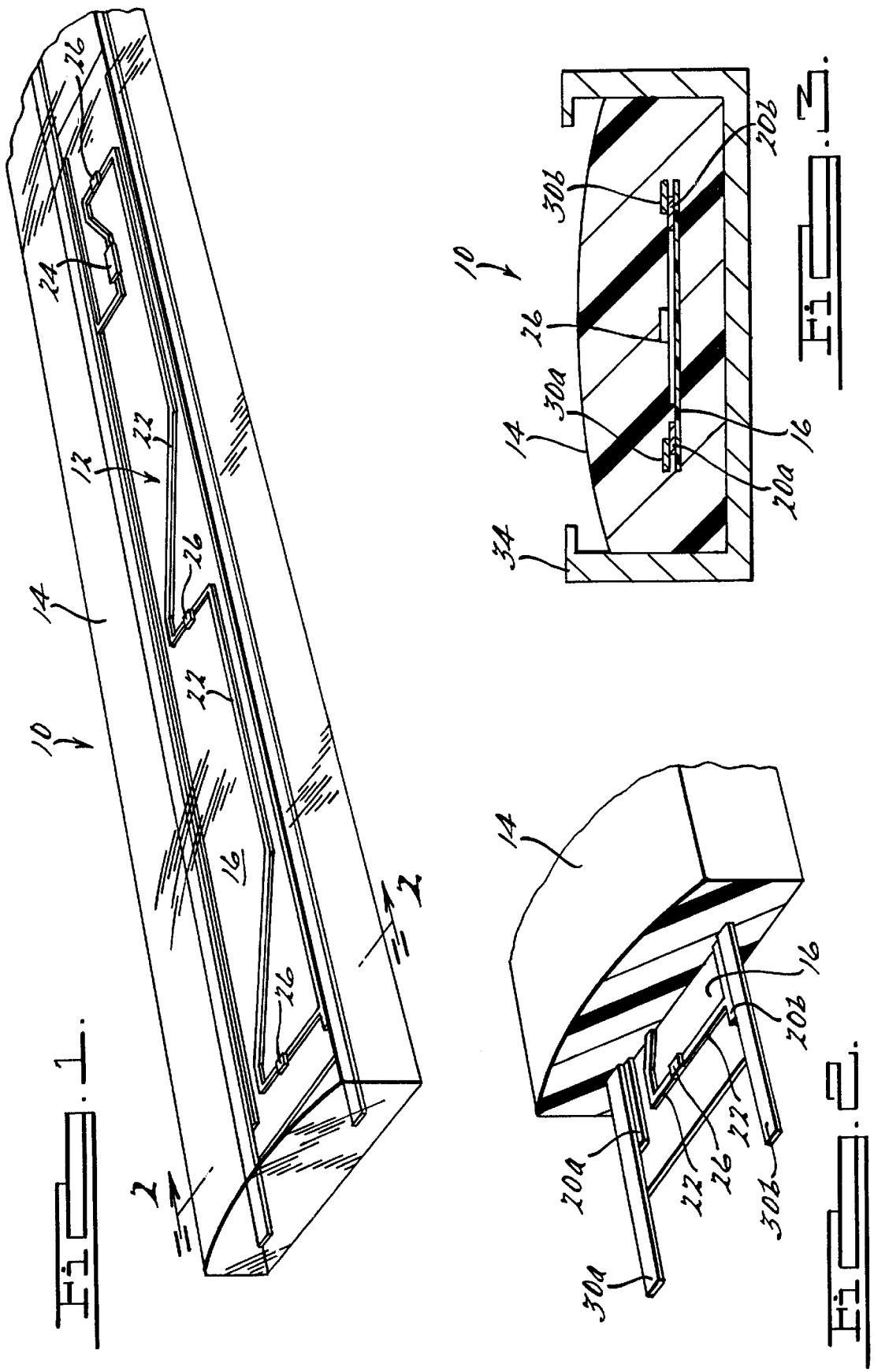

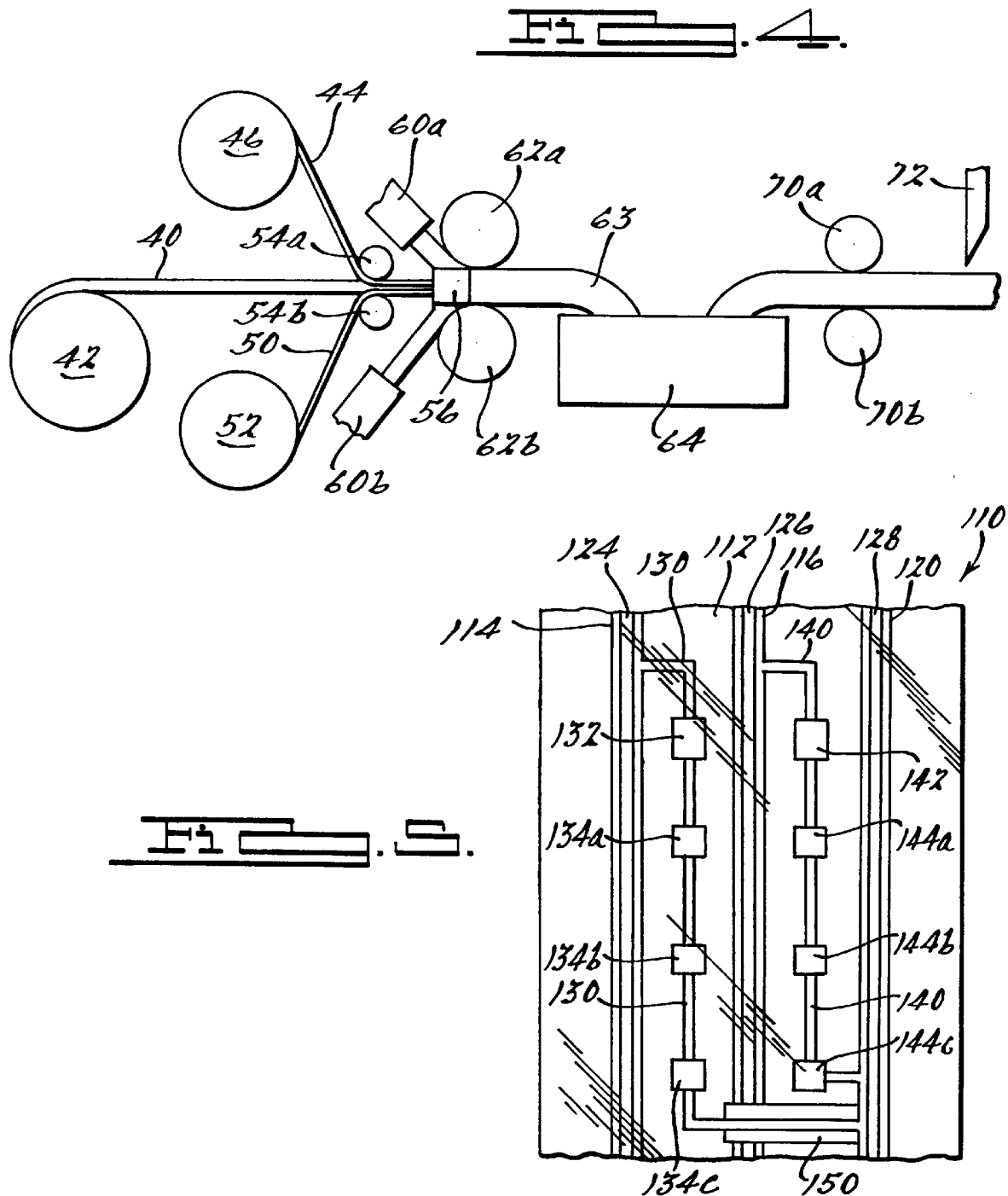

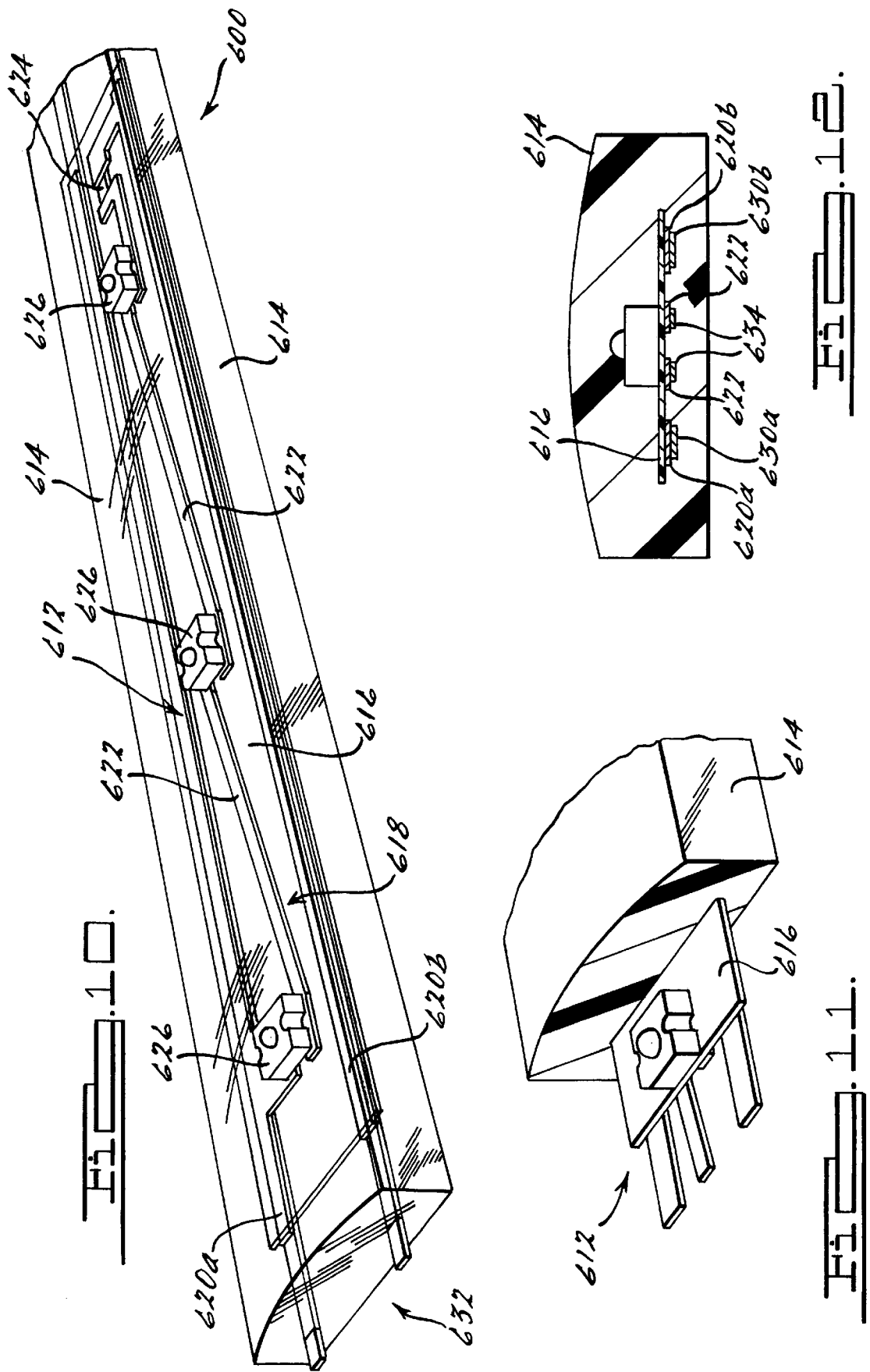

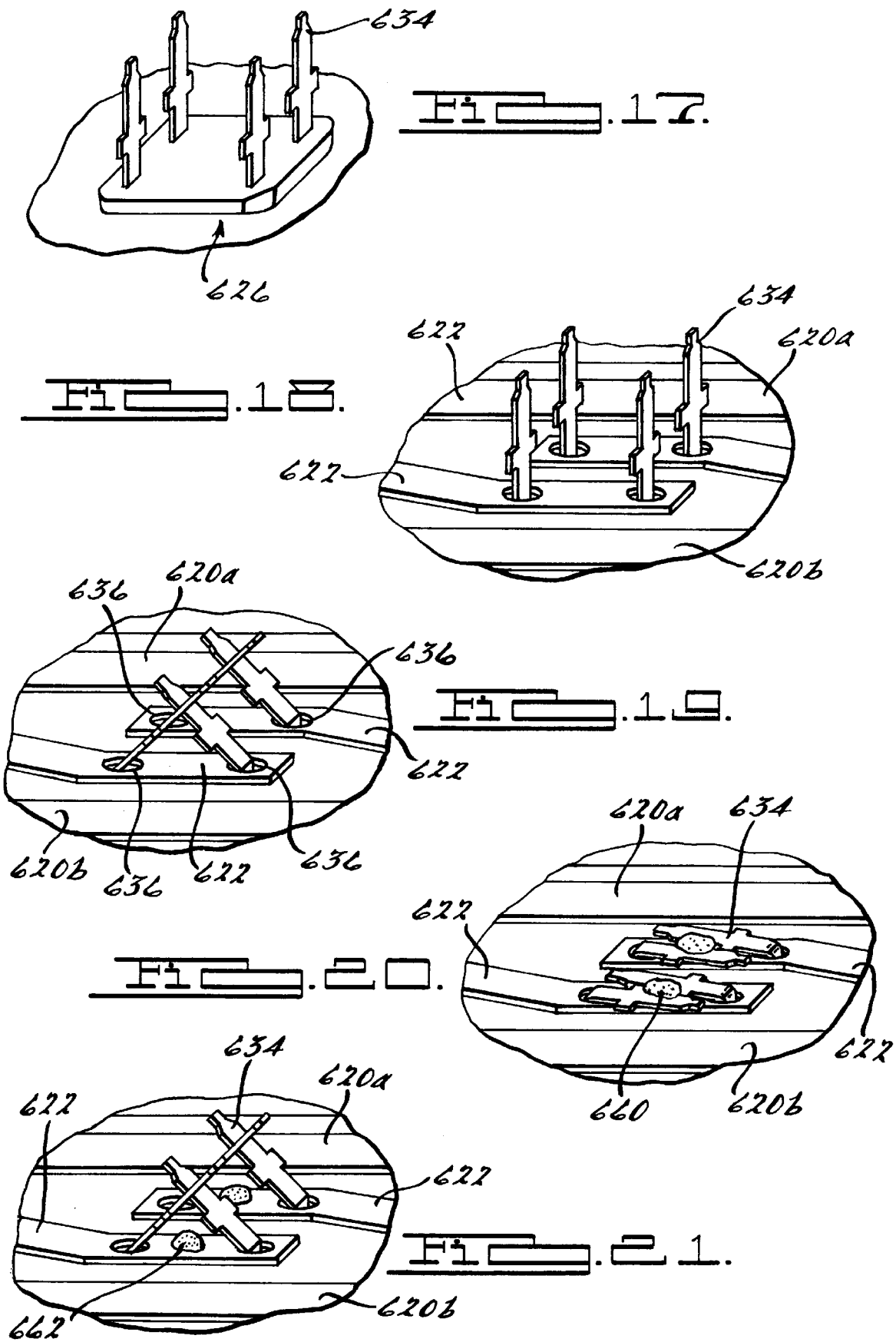

INTEGRALLY FORMED LINEAR LIGHT STRIP WITH LIGHT EMITTING DIODES

RELATED APPLICATIONS

This application is a continuation-in-part of U.S. patent application Ser. No. 08/520,237, filed Aug. 28, 1995, in the name of Thomas L. Gustafson, for "Integrally Formed Linear Light Strip with Light Emitting Diodes".

BACKGROUND OF THE INVENTION

The present invention relates generally to light strips and, more particularly, to an integral single piece light strip containing light emitting diodes, and a process for forming such a light strip, in which the diodes and associated circuitry are protected from moisture ingress and from other potential causes of damage.

Light emitting diode (LED) light strips are commonly used to provide visual pathways or marked locations in otherwise dark, unlit areas. Such LED light strips are advantageous when compared to bulb or lamp-based markers in that the strips are relatively inexpensive to manufacture and are relatively easy to install. Further, the LEDs used in these light strips typically have a longer life than conventional lamps or bulbs.

Present LED light strips consist of circuitry including a plurality of LEDs mounted on a substrate and connected to electrical conductors. The circuitry is encased within a tubelike, partially transparent protective sheathing and connected to a power source for selective LED illumination. Two exemplary types of LED strips are described generally in U.S. Pat. No. 5,130,909 to Gross, issued Jul. 14, 1992 and entitled "Emergency Lighting Strip" and U.S. Pat. No. 4,597,033 to Meggs et al., issued Jun. 24, 1986 and entitled "Flexible Elongated Lighting System." Such strips are utilized in a variety of indoor and outdoor configurations such as emergency pathway markers, exit door indicators and ornamental lighting arrangements.

Regardless of the application, it is imperative that the LED circuitry is housed within some type of protective sheathing. The protective sheathing must be of sufficient strength to prevent damage to the circuitry due to excessive loads, such as the weight of machinery, being directly applied to the strip. Further, because the LED circuitry is highly susceptible to damage and malfunction caused by exposure to moisture, the protective sheathing must be impervious to moisture.

While the aforementioned LED light strips protect the circuitry housed within, the strips have associated limitations. The tube-like sheathings typically used as housings for present LED light strips provide minimal protection against mechanical damage to the LED circuitry due to excessive loads placed on the sheathings. Further, the aforementioned light strips provide the LED circuitry with only limited protection from moisture. The sheathing seals or strip ends through which the LED circuitry is inserted are typically susceptible to moisture penetration. Further, protective sheathings such as those described in the abovementioned patents are substantially hollow, thereby increasing the susceptibility of such sheathings to moisture condensation. As a result, such light strips often prove to be unreliable from a moisture protection standpoint, especially in outdoor lighting applications or other applications in which the strips are exposed to extreme weather conditions. Consequently, it would be desirable to encase the LED circuitry in a more permanent type of protective sheathing that did not have the above mentioned drawbacks associated with tube-like sheathings.

One such type of permanent protective sheathing is commonly used for encapsulating electroluminescent (EL) lamps and is formed by sealing a multi-layer EL lamp configuration by a conventional sheet, or hard, lamination process. In this conventional hard lamination process, a top layer of protective film is either adhesively bonded or thermally fused to a bottom layer of protective film through the use of high temperatures and high pressure rollers, thereby sandwiching the EL lamps between the layers.

While EL strips formed through the above hard lamination process provide a layer of protection, the multi-layer EL lamps housed within such strips are also susceptible to moisture damage. Moisture is often capable of penetrating into the interior of the two-piece strips through the fused or bonded seal joining the two-piece housing, especially when the strips are utilized in outdoor applications or after the bonded or fused seal connecting the two-piece housing weakens upon aging of the strip. In addition, such a hard lamination process would not be desirable for use with LED circuitry. EL lamps include multiple layers of substantially flat conductive and non-conductive material that are easily sandwiched between top and bottom laminate layers. Conversely, because LEDs in LED light strips typically have a height of 0.040 inch or more, the high pressure rollers typically used to bond or fuse the two-piece housing could crush protruding LEDs during formation of an LED strip. In addition, the high temperatures associated with the bonding or fusing steps in a hard lamination process would subject the LEDs and associated circuitry to heat damage, thus rendering an LED strip manufactured by such a process nonfunctional.

Therefore, a need exists for an improved single piece integral LED light strip that is impervious to moisture and that provides a high degree of protection against other forms of potential damaging elements. There also exists a need for a soft lamination process for producing such an elongated single piece integral LED light strip in which a protective housing encapsulates the LED circuitry so that an integral single piece LED light strip is produced in a cost effective manner without subjecting the circuitry to damaging high pressures or high temperatures.

SUMMARY OF THE INVENTION

Accordingly, the present invention relates to an integrally formed single piece light strip having no internal voids, comprising first and second bus elements spaced apart from one another by a predetermined distance for operative connection to a power source, a substrate strip including top and bottom surfaces including a printed circuit thereon, at least one light emitting diode (LED) including electrical contact prongs, the LED being mounted on the top surface of the substrate strip with the electrical contact prongs contacting the printed circuit on the bottom surface of the substrate strip, the printed circuit being in electrical contact with the bus elements to conduct electricity thereon, an extruded plastic material completely encapsulating the first and second bus elements, the substrate strip and the LED to thereby provide a protective barrier and thereby make the light strip impervious to moisture ingress.

The present invention further includes an integrally formed light strip, comprising first and second bus elements spaced apart from one another by a predetermined distance for operative connection to a power source, a substrate strip including a printed circuit thereon, the substrate strip being positioned relative to the first and second bus elements to electrically connect the print circuit to the bus elements, at least one light emitting diode (LED) being electrically connected to the printed circuit, the LED being illuminated upon the bus elements conducting electricity, and a plastic material extruded over the first and second bus elements, the substrate strip and the LED to completely encapsulate the first and second bus elements, the substrate strip and the LED to thereby provide a light strip protective barrier, the extruded plastic material being extruded to define a top surface and a bottom surface, with the bottom surface defining a channel therein.

The present invention further includes a method of manufacturing an integrally formed single piece light strip having no internal voids. The method further includes the steps of continuously feeding bus elements to an extruder; feeding a substrate strip having top and bottom sides and including a printed circuit on said bottom side, and a plurality of apertures formed therein; mounting at least one LED including electrical contact prongs to the substrate and contacting the contact prongs to the printed circuit; feeding the LED and the substrate strip to the extruder; and extruding the plastic at a temperature that which would not damage the LED and the printed circuit to encapsulate the bus elements, the LED and the circuit.

These and other various advantages and features of the present invention will become apparent from the following description and claims, in conjunction with the appended drawings.

BRIEF DESCRIPTION OF THE DRAWINGS

FIG. 1 is a perspective view illustrating a light strip according to a preferred embodiment of the present invention;

FIG. 2 is a perspective view, partially in cross-section and broken away, illustrating the LED circuitry encapsulated within the plastic material;

FIG. 3 is a cross-sectional view of the strip shown in FIG. 1 mounted into a protective track;

FIG. 4 is a schematic view illustrating a process for manufacturing the LED light strip according to the present invention;

FIG. 5 illustrates a second embodiment of the present invention;

FIG. 10 is a perspective view illustrating a light strip according to a fifth embodiment of the present invention;

FIG. 11 is a perspective view, partially in cross-section and broken away, illustrating the LED circuitry of FIG. 10 encapsulated within the plastic material;

FIG. 12 is a full cross-sectional view of the strip shown in FIG. 11;

FIGS. 17–22 illustrate the process utilized for forming the circuitry encapsulated within the light strip of FIG. 10;

DETAILED DESCRIPTION OF THE PREFERRED EMBODIMENTS

Figure 6:
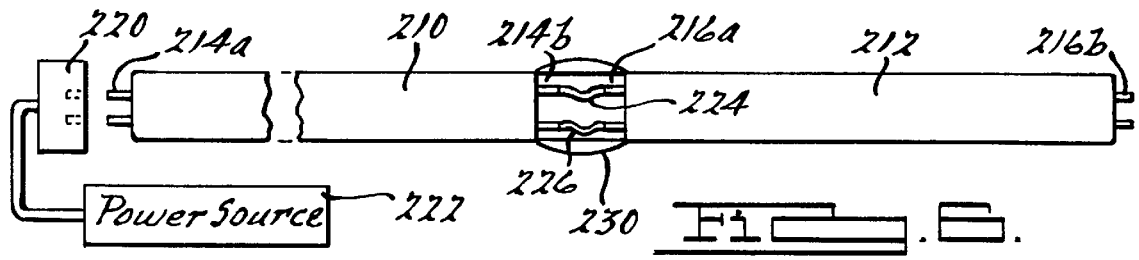
FIG. 6 illustrates a third embodiment of the present invention.

Referring to the drawings, an LED light strip according to the preferred embodiment of the present invention is shown generally at 10 in FIG. 1. The light strip includes LED circuitry, shown generally at 12 and described in detail below, encapsulated within an integral single piece thermoplastic housing 14 having no internal voids. Thus, the light strip 10 is not only durable and capable of withstanding considerable loads, but also is impervious to moisture, and thereby protects the LED circuitry 12 from damage due to moisture ingress. The thermoplastic housing 14 is preferably composed of a low vapor transmission rate polymeric material such as SURLYN®, an ionomer resin, a high density polyethylene, or polychlorotrifluoroethylene.

FIG. 2 shows the light strip of FIG. 1 with the housing partially cut away along sectional line 2—2 to reveal the encapsulated LED circuitry. As shown in FIG. 2, the LED circuitry 12 is mounted on a substrate 16 containing a printed circuit. Preferably, the substrate is a polyester film having a thickness of approximately 0.005 inches. However, any substrate, such as a fiberglass or a polyamide substrate, exhibiting parameters necessary for the manufacturing process described below may be used. The printed circuit includes conductive bus contacts 20a, 20b that extend longitudinally along the length of the substrate and that are operatively connected to the printed circuit tracks 22. A resistor 24 (FIG. 1) and light emitting diodes (LEDs) 26 of the type well known in the art are operatively contacted to the PCB tracks 22 between the conductive bus contacts 20a, 20b. The printed circuit bus contacts 20a, 20b electrically contact bus elements 30a, 30b, respectively, which also extend longitudinally through the length of the strip. As will be described in more detail below, bus elements 30a, 30b are connected to a remote power source. Therefore, electricity is selectively supplied over the bus elements 30a, 30b from a remote power source to illuminate the LEDs 26 in response to certain predetermined conditions dependent upon the particular light strip application. While FIG. 1 shows three LEDs 26 mounted on the substrate 16, it should be appreciated at this point that any number of LEDs may be implemented in a similar manner.

FIG. 3 illustrates a cross-sectional view of the light strip shown in FIG. 1. According to the preferred embodiment of the present invention, the light strip is approximately 0.4 inches in height and 1.3 inches in width. Also, as shown in FIG. 3, if a particular application so dictates, the LED light strip may be mounted in a protective track 34 formed from aluminum, high density plastic or ethylene propylene diene monomer (EPDM) rubber. The strip is pulled into the aluminum track from one end and then is permanently attached to the track through the use of a bonding agent, such as an adhesive bond or mechanical fasteners, of the type well known in the art. Mechanical fasteners may be used to secure both the strip within the track and the track to the mounting surface. Subsequent to the formation of a shallow channel in a concrete, asphalt or other similar surface through use of a cutting tool well known in the art, the track 34, and the light strip housed within, may be inserted, pulled or snapped into the channel and thus flush mounted with the finished surface with negligible effect on surface integrity. Thus, the track 34 provides additional protection to the light strip from large loads placed upon the light strip and further facilitates the flush mounting of the light strip in areas such as an airport taxiway or an automobile highway. Such a light strip/track system could include light strips using different color lamps that could alternately be activated or flashed as required by a central control such as an airport control tower. It is also contemplated that such a system would be designed to conform to the pertinent sections of FAA Circular AC150/ 5345-46A.

FIG. 4 illustrates a dual extrusion assembly line for manufacturing an LED light strip according to a preferred embodiment of the present invention. As shown, a continuous length of LED light strip substrate mounted LED circuitry 40 including resistors and LEDs operatively mounted to a printed circuit on the substrate is fed from an LED light strip roll 42. Although a continuous length of LED light strip substrate is shown being fed from the roll 42, it should be appreciated that discrete sections of light strip substrate could also be individually fed from the roll 42 or other similar feed mechanism. A first continuous length of a first bus element 44 is fed from a first bus element roll 46. Similarly, a second continuous length of a second bus element 50 is fed from a second bus element roll 52. The bus elements could both be positioned on the top surface of the substrate, both on the bottom surface of the substrate, or one on each of the top and bottom surfaces of the substrate, according to desired design parameters. As with the light strip substrate, the bus elements 44, 50 could also be fed in discrete sections rather than in a continuous length manner. The bus elements may be fed in a manner so that the elements are positioned above or below the conductive bus contacts of the substrate as desired. The continuous lengths of the substrate-mounted LED circuitry 40 and bus elements 44 and 50 are brought together through feeder rolls 54a and 54b, and are then fed into a molten thermoplastic stream supplied from extruders 60a and 60b in the form of both a top layer and a bottom layer. The thermoplastic material is extruded at a temperature less than 350° F., the temperature at which thermal distortion of the LEDs and wrinkling of the polyester substrate occurs. However, the extrusion temperature may vary according to the particular type of thermoplastic material used and the particular process parameters.

Once the extruders 60a and 60b have encapsulated the circuitry and the bus elements within the single piece housing, top and bottom layers of extruded thermoplastic material are each individually profiled by forming rolls 62a, 62b upon exit of the die 56 at a temperature of approximately 340° F. It should be noted that the distance traveled from the die to the forming rolls 62a, 62b may be varied to allow for various degrees of cooling of the newly formed strip in relation to the particular mass of the extruded strip.

It should be further appreciated that, through this profiling, both the top layer and the bottom layer of extruded material may breathe, allowing for control of extruded material displacement upon introduction of the substrate mounted LED circuitry into the extrusion, and therefore allowing excess extruded material to be vented to the side and trimmed by a strip trimmer (not shown).

Upon exiting the die and passing through the forming rolls 62a, 62b, the newly formed LED light strip 63 is fed into a cooling tank 64. Preferably, the cooling tank contains cooled water into which the newly formed strip 63 is immersed for a predetermined amount of time. After this predetermined amount of time, the LED light strip 63 is fed from the cooling tank 64 through feed rollers 70a, 70b to a cutting machine 72 of the type well known in the art and is cut into discrete segments of a predetermined length. The light strip may be cut into discrete segments corresponding to the discrete printed circuits printed on the polyester substrate to which the LEDs are electrically contacted. The extruded thermoplastic material thus encapsulates the substrate mounted LED circuitry and the bus elements in a single piece housing. Because each of the individual LEDs in the strip array are sealed in the thermoplastic material formed in the housing, the LEDs are isolated from one another. Thus, as the LED light strip is cut to a desired length between any discrete printed circuit formed on the polyester substrate, the LED configurations will not be exposed.

FIG. 5 shows an alternate embodiment of the present invention generally at 110. With the light strip 110, a substrate 112 includes conductive bus contacts 114, 116, 120 which electrically contact bus elements 124, 126, 128. The bus elements 124 and 126 and the corresponding conductive bus contact strips 114 and 116 are positioned adjacent to one another, with contact strip 120 and the corresponding bus element 128 being located on the far right side of the strip 110. The printed circuit track 130 is thus connected between the bus contact 114 and the bus contact 120, while the printed circuit track 140 is connected between the bus contact 116 and the bus contact 120. A resistor 132 and LEDs 134a–134c are electrically contacted to the printed circuit track 130, while a resistor 142 and LEDs 144a–144c are electrically contacted to the printed circuit 140. To prevent the printed circuit track 130 from electrically contacting the bus contact 116, a nonconductive pad 150 is located between the bus element 126 and the printed circuit track 130 to insulate the track 130 from electrical contact with the bus element.

FIG. 6 shows the electrical interconnection of two LED light strips 210 and 212. As shown, a first end of the light strip 210 includes an electrical connector 214a, while a second end includes an electrical connector 214b. Similarly, the light strip 212 includes a first end having an electrical connector 216a that mates with the connector 214b of the light strip 210. A second end of the light strip 212 includes an electrical connector 216b for connection with another light strip or with a terminating element (not shown). The connector 214a shown is capable of mating with an electrical socket 220 of a remote power source 222 for providing electrical power to the light strip. As shown, the electrical connectors 214a, 214b and 216a, 216b are metal connector pins heat-staked into the thermoplastic to contact the strip bus elements for interconnection of the light strips or for connection of light strips to the power source 222. Corresponding pins in the strips may be interconnected by wires 224, 226 and then encased within a protective covering 230. The electrical connectors may also be of the type such as the connector disclosed in U.S. Pat. No. 5,391,088, assigned to AMP, Inc. and entitled "Surface Mount Coupling Connector", hereinafter incorporated by reference. Alternatively, the housing encapsulating the bus elements could be stripped away from the bus elements and the bus elements could be interconnected or connected to a remote power source through conventional wiring techniques.

Figure 7:
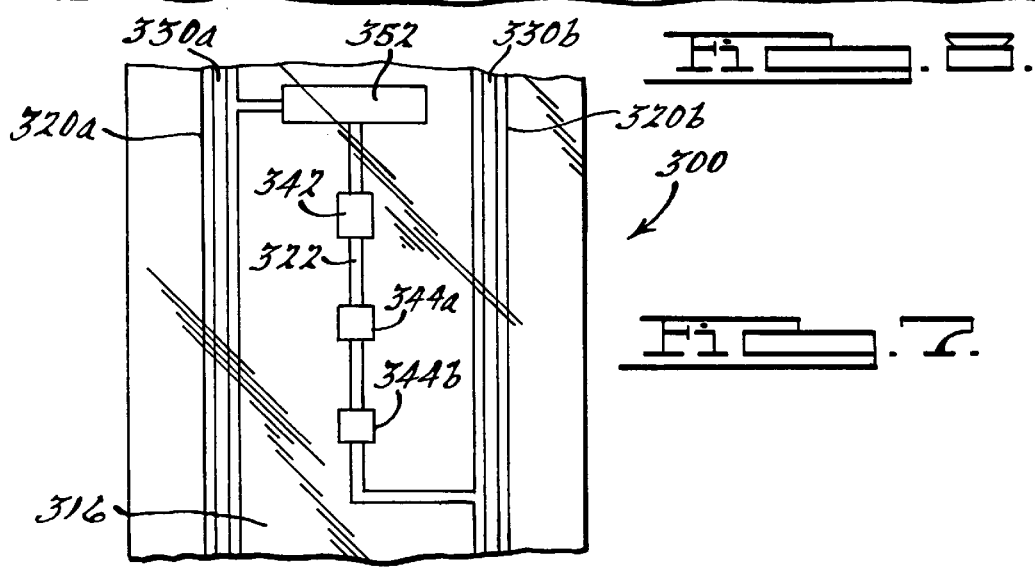
FIG. 7 illustrates a fourth embodiment of the present invention.

FIG. 7 illustrates another preferred embodiment of the present invention, which is shown generally at 300. The light strip includes a substrate 316 including printed circuit bus contacts 320a, 320b electrically contacting bus elements 330a, 330b and PCB tracks 322 connected between the bus contacts 320a, 320b. A resistor 342 and LEDs 344a, 344b are mounted to the PCB tracks 322 and are selectively illuminated when the bus elements 330a, 330b conduct electricity supplied from a remote power source. However, the LED light strip 310 also includes a microcontroller 352 of the type well known in the art. The microcontroller 352 makes the strip 300 addressable so that the LED circuitry contained within the LED light strip may be pulsed or selectively illuminated in a particular pattern in order to more clearly mark a particular pathway.

Figure 8:
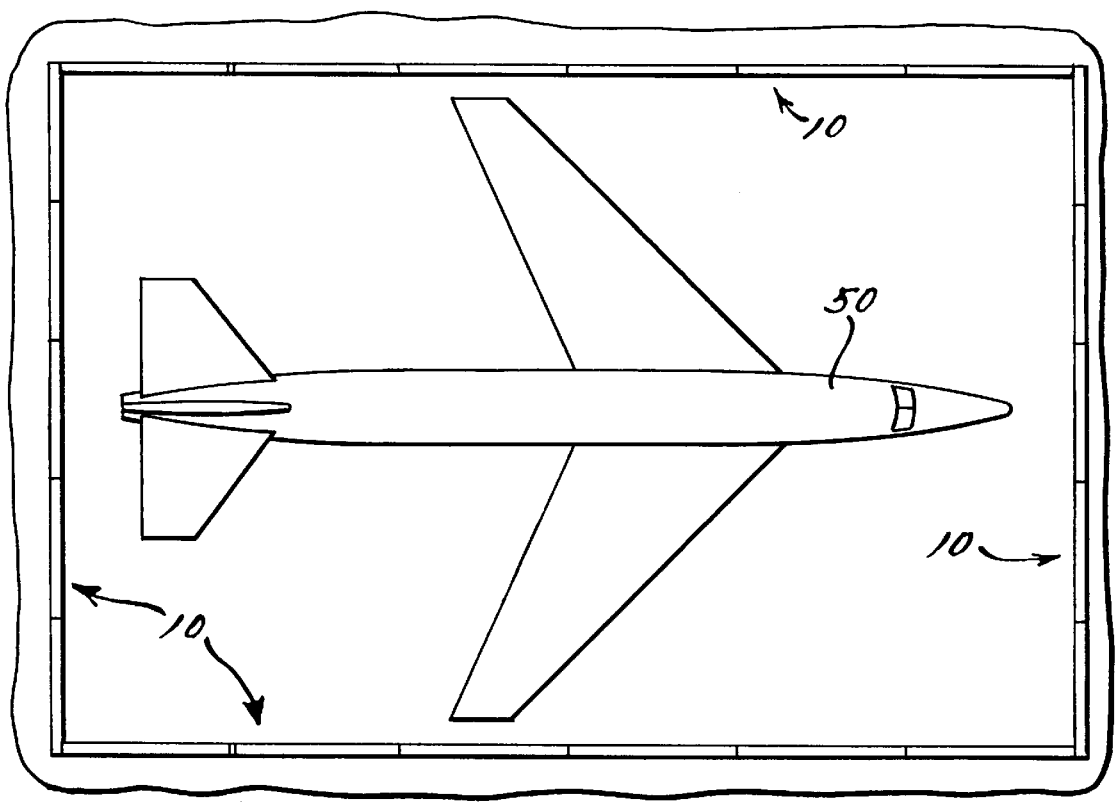
FIG. 8 is a plan view illustrating the implementation of multiple discrete segments of an LED light strip of the type shown in FIG. 1 to illuminate a section of an airport taxiway.

FIG. 8 illustrates one contemplated environment in which the multiple light strips 10 of the present invention may be implemented. In this particular environment, discrete sections of light strips are inserted into protective flush mounted tracks such as the track 34 and electrically interconnected by aforementioned means to form an airport holding box for a jet airplane 50. It is contemplated that implementation of these light strips for airplane holding boxes or for actual runway lighting would more clearly mark such pathways than presently used and more expensively implemented lighting systems. In addition, the LED light strip of the present invention represents a significant improvement over conventional airport lighting systems, such as halogen MR-16 light systems, in that LED light strips can be surface mounted to the runways with only minor disturbance to the actual integrity of the runway surface, as the light strip of the present invention eliminates the necessity of burying cables associated with typical runway light systems. Further, because the LED light strips are surface mounted, additional complications, such as problems often encountered with ground water tables, are avoided.

Figure 9A:
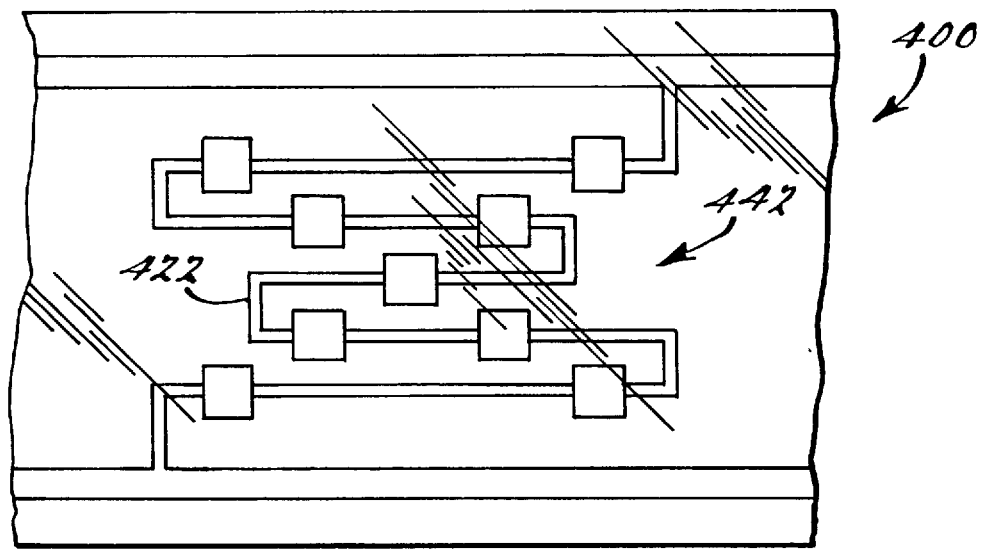
FIGS. 9A–9B are plan views illustrating alternative configurations of LEDs implemented in the LED light strip of the present invention.
Figure 9B:
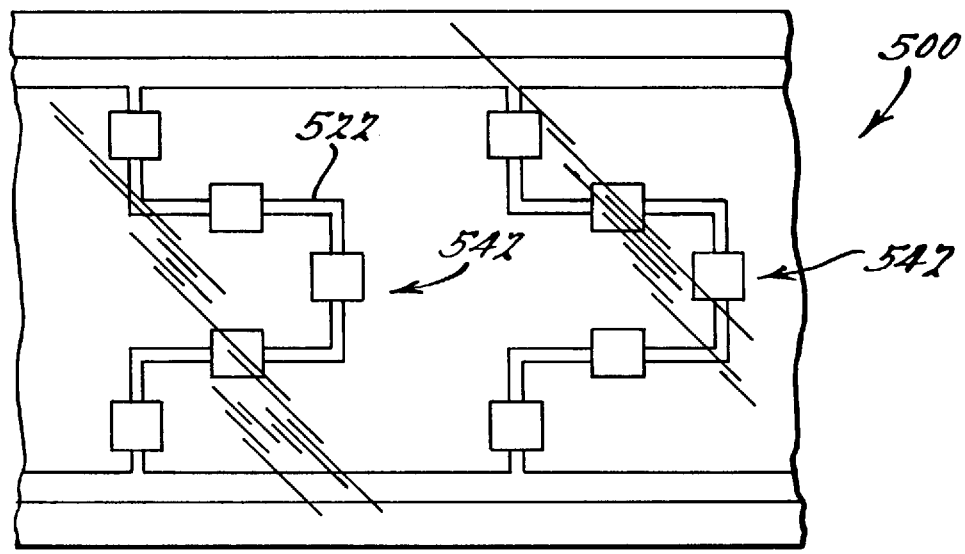

It is also contemplated that the LED light strips of the present invention may be manufactured and implemented with any number of desired rows or configurations of encapsulated LEDs. FIGS. 9A and 9B show two such alternative configurations. The LED light strip shown at 400 in FIG. 9A includes a plurality of LEDs, indicated generally at 442, configured on a PCB track 422 to form an X. The LED light strip shown at 500 in FIG. 9B includes a plurality of LEDs, indicated generally at 542, configured on a PCB track 522 to form an arrow or chevron. Strips such as those shown at 400 and 500 could be correspondingly utilized in conjunction with a microcontroller, such as the microcontroller 352 shown in FIG. 7, to selectively indicate either a STOP or a GO condition in response to a particular runway or other type of traffic environment condition.

Referring to FIGS. 10–12, a fifth preferred embodiment of the light strip according to the present invention is shown generally at 600. The light strip is generally similar in construction to the light strip 10 shown in FIG. 1, in that the LED circuitry 612, which is described in detail below, is encapsulated within an extruded integral single piece thermoplastic housing 614 composed of a polymeric material identical to the housing 14. However, the LED circuitry 612 implemented in the strip 600 differs in structure, as will now be described.

FIG. 11 shows the light strip 600 with the housing 614 partially cut-away to reveal the encapsulated LED circuitry 612. As shown in FIGS. 11 and 12, the LED circuitry 612 is mounted on a substrate strip 616 including a printed circuit 618. The substrate 616 is a polyester film identical to that shown in FIG. 2. The printed circuit 618 includes conductive bus contacts 620a, 620b that extend longitudinally along the length of the substrate and that are operatively connected to printed circuit tracks 622. Additionally, a resistor 624, whose value depends on the type of voltage source used and the required current value, along with light emitting diodes (LEDs) 626, are operatively connected to the printed circuit tracks 622 between the conductive bus contacts 620a, 620b. The conductive bus contacts 620a, 620b electrically contact bus elements 630a, 630b, respectively, which extend longitudinally through the length of the strip 600. The bus elements 630a, 630b are preferably connected to a remote power source (not shown) through an electrical connector, such as that shown in 632, which is preferably heat-staked to one end of the strip. Preferably, the electrical connector is of the type manufactured by AMP, Inc., as referenced above.

Figure 13:
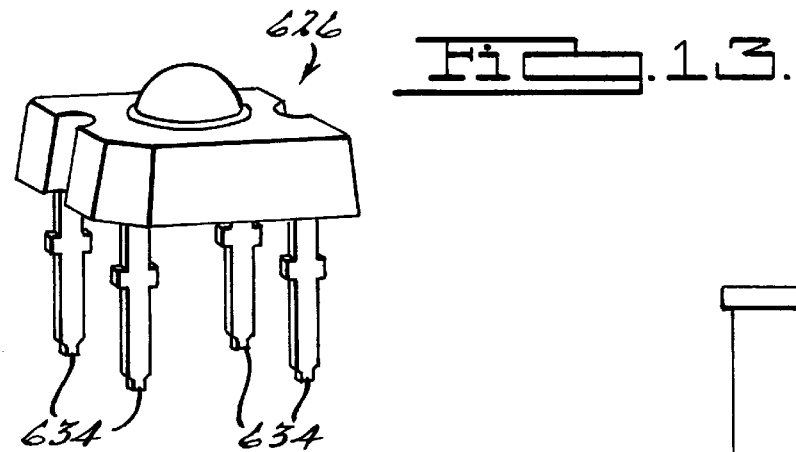
FIG. 13 is a front elevational view of an LED implemented in the light strip of FIG. 10.

The LEDs 626 differ from the LEDS 26 in that they are preferably high power automotive LEDs, such as Hewlett Packard Model Nos. HPWA-MH00, HPWA-ML00, or HPWR-M300. As shown in FIG. 13, these LEDs include four connector pins 634 for electrically connecting the LEDs to the conductive bus contacts 620a, 620b, and thus the bus elements 630a, 630b, for selective illumination of the LEDs. The printed circuit 618 is formed on the bottom surface of the substrate strip 616; therefore, the connector pins must be inserted through the substrate strip to contact the printed circuit contacts. Thus, the substrate strip 616 is preferably formed with LED apertures 636 as shown in FIG. 18. These apertures 636 facilitate both proper placement of the LEDs on the substrate strip and electrical connection of the LEDs with the printed circuit tracks, when assembled as will now be described.

Figure 14:
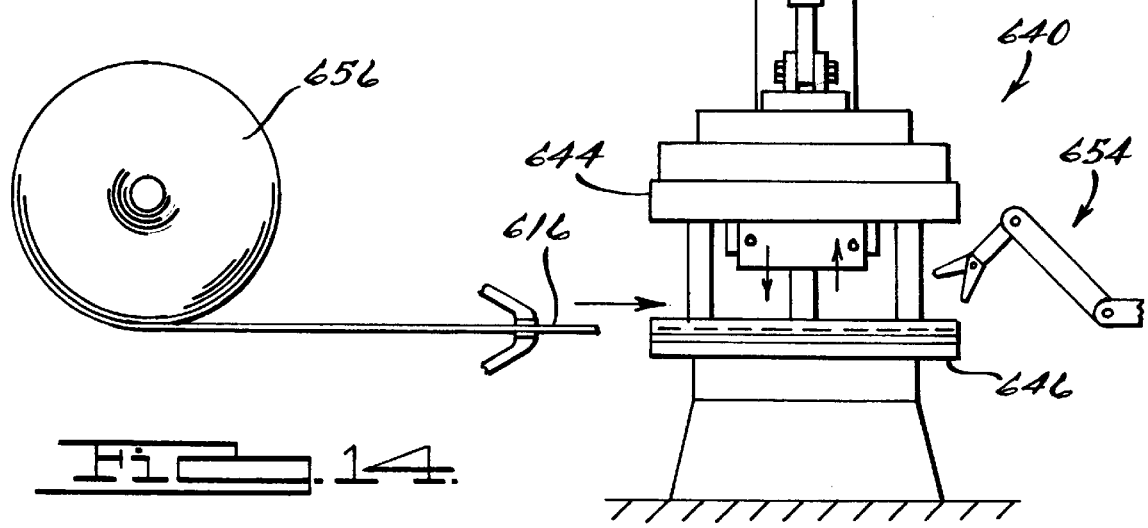
FIG. 14 is a front elevational view of a die for forming the circuitry encapsulated within the light strip of FIG. 10.
Figure 16:
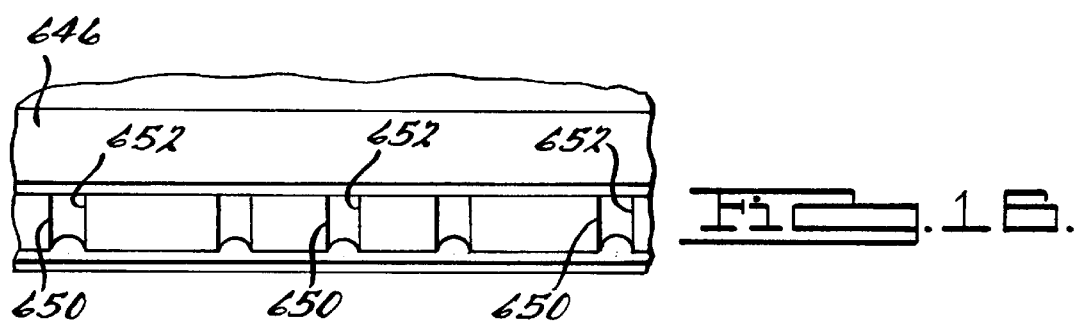
FIG. 16 is a top elevational view of the die of FIG. 14 showing the bottom mold portion thereof.
Figure 15:
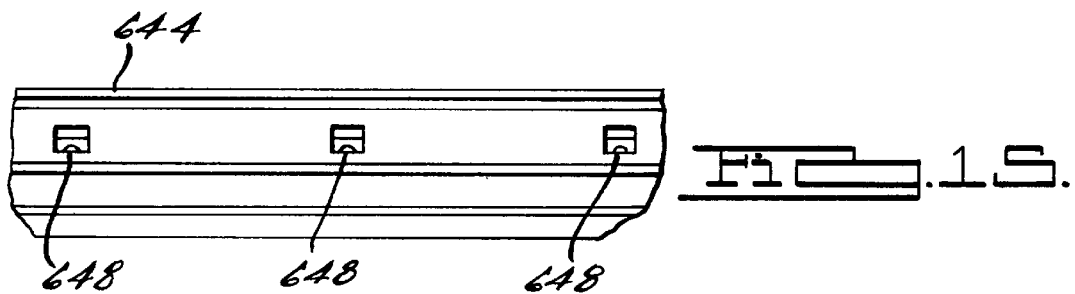
FIG. 15 is a bottom elevational view of the die of FIG. 14 showing the top mold portion thereof.

Referring to FIGS. 14–22, a preferred method of assembling the LED circuit shown in FIG. 10 will now be described. The method is implemented using a conventional pneumatically operated die 640, shown in FIG. 14. As shown in FIGS. 15 and 16, the die includes lower and upper portions 644, 646, respectively, that are selectively moved into operative contact with one another. The die lower portion includes detents 648 into which the light emitting bulbs of the LEDs nest as the die upper portion is closed onto the die lower portion. The die upper portion includes grooves 650 with inwardly sloping guide walls 652 for crimping the LED connector pins to the printed circuit on the bottom of the substrate strip. Also, a robot, such as that shown at 654, or other similar automated mechanism well known in the manufacturing art, is associated with the die for retrieving LEDs from a remote LED supply (not shown) and for placing the LEDs in position within the die. Additionally, a substrate strip supply 656 is positioned adjacent the die for supplying substrate strips into position in the die, as will now be described.

As shown in FIG. 17, the robot places an LED or LEDs in position on the substrate strip by inserting the LEDs in a leg-up orientation within the detents 648. As shown in FIGS. 14 and 18, the substrate strip 616 is then fed into the die 640 from the substrate supply in a predetermined alignment and is inserted over the LED connector pins. As shown in FIG. 19, after the substrate is placed over the LED connector pins, the top portion die 646 is closed, thereby causing the LED connector pins 634 to be deformed inwardly as shown as the pins are pressed against the guide walls 652. The connector pins 634 are thus crimped against the printed circuit tracks 622 on the underside of the substrate strip as shown in FIG. 20. Once the connector pins are crimped into contact with the printed circuit tracks, the die is opened, and the newly formed LED circuitry is then fed to the extruder, in a manner similar to the LED circuitry shown in the extrusion system of FIG. 4.

Figure 22:
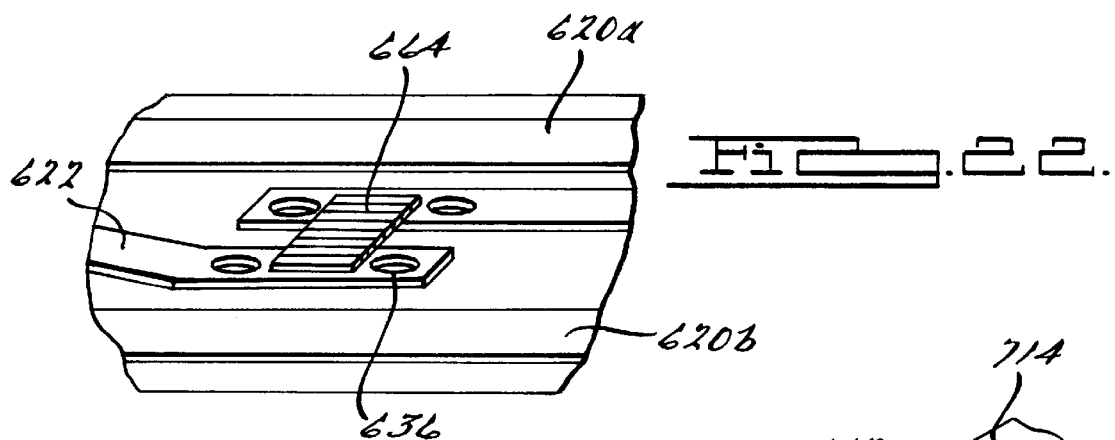

Alternatively, the LED circuitry assembly process may include the additional step of soldering the connector pins to the printed circuit subsequent to the pins being crimped into contact with the printed circuit, as is evidenced by the applied solder 660 in FIG. 20. Alternatively, as shown in FIG. 21, a post applied conductive epoxy 662 could be applied onto the crimped connector pins before or during crimping of the pins to ensure permanent contact of the pins with the printed circuit tracks. Alternatively, as shown in FIG. 22, a material 664 including alternating layers of conductive and nonconductive material, such as the elements manufactured by Elastomeric Technologies, Inc. of Hatboro Pennsylvania and commercially sold under the names of STAX™ and MOE™, could be utilized for electrically connecting the LED connector pins with the printed circuit tracks. The elements could be positioned on the underside of the substrate with conductive layers being in contact with the printed circuit tracks and the connector pins being crimped into contact with these conductive layers, thereby electrically connecting the connector pins to the printed circuit.

Figure 23:
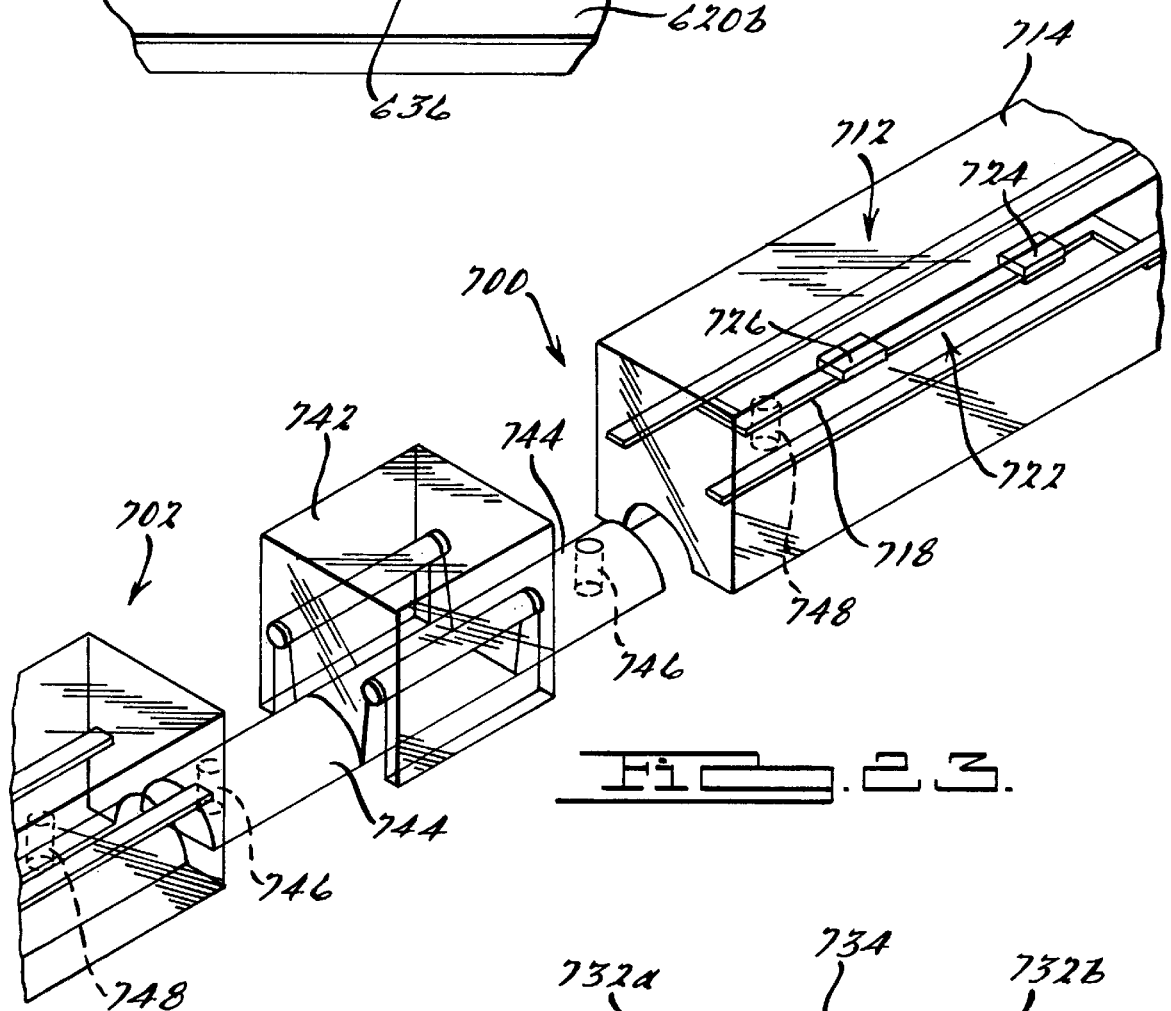
FIG. 23 is a perspective view illustrating two light strips according to a seventh embodiment of the present invention along with an electrical connector associated therewith.
Figure 24:
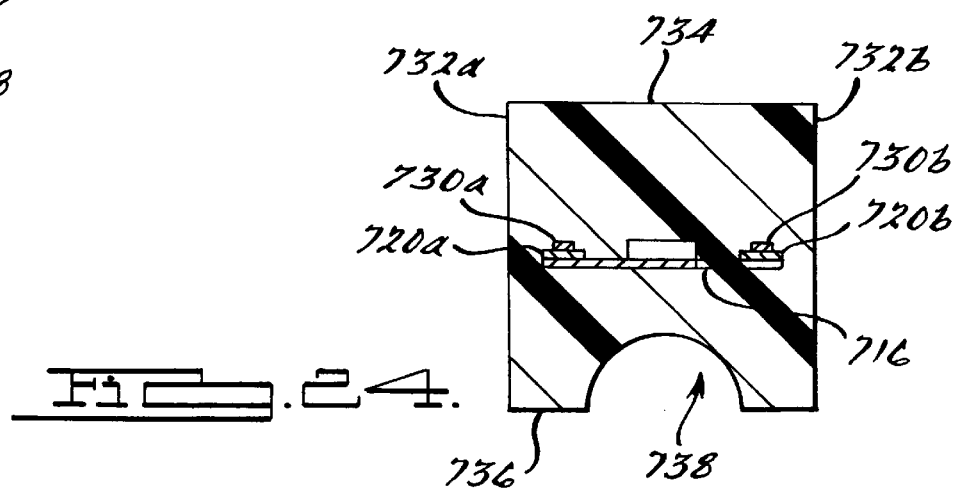
FIG. 24 is a cross-sectional view of one of the light strips of FIG. 23.

Referring to FIGS. 23 and 24, a sixth embodiment of the present invention is shown generally at 700 and 702. The light strip 700, as is the light strip 702, is substantially similar to the light strip shown at 10 in FIG. 1. The light strip 700 includes LED circuitry 712 encapsulated within an integral single piece thermoplastic housing 714 having no internal voids. The LED circuitry 712 is mounted on a substrate strip 716 containing a printed circuit 718 which may be printed on either the top or bottom side of the substrate strip. The printed circuit includes conductive bus contacts 720*a*, 720*b* that extend longitudinally along the length of the substrate and are in operative contact with printed circuit tracks 722. A resistor 724 and a light emitting diode 726 are operatively contacted to the printed circuit tracks 722. The printed circuit bus contacts 720*a*, 720*b* electrically contact bus elements 730*a*, 730*b*, respectively, which extend longitudinally through the length of the strip.

The thermoplastic housing 714 is extruded in a manner similar to that used in the extrusion of the housing 14 shown in FIG. 1. However, as shown in FIG. 24, the housing is extruded so as to form a substantially square cross-sectional housing preferably having dimensions of, for example, about 0.375 inches. The housing thus includes sides 732*a*, 732*b* and a top surface 734 of equal dimensions. In addition, the bottom surface 736 is also of equal dimension but also includes a channel 738 defined therein. The channel is operative for accepting a connector, such as the connector 742 shown in FIG. 23, for electrically connecting separate light strips, such as the light strip 700, through a friction fit of the interlocking flanges 744 within the channels of the light strips. Alternatively, an adhesive such as an epoxy may be applied to the flanges to secure the flanges within the channels. Also, the flanges may be formed with upwardly-extending posts shown in phantom at 746. The strips could include post holes shown in phantom at 748 drilled therein into which the posts 746 would be inserted for interlocking the strips.

It is contemplated that the light strip according to the above described embodiments of the present invention has application in a wide variety of environments. The following includes several of these contemplated applications although the following is not intended to be an exhaustive list.

The light strip has application in a traffic control environment, such as:

Aircraft guidance lighting; ground vehicle guidance lighting; chasing-effect guidance lighting from runway to arrival gate; red/green traffic control lighting across active runaways; taxiway numbering; directional sign outline lighting; smart sensor-activated lighting for traffic control; temporary barrier demarkation; high hazard permanent marking; traffic impedance marking (i.e., dangerous bridge abutments, narrow zones, etc.); active road signs; left turn/right turn guidance strip; contra-flow control with directional LEDs; difficult intersection control; high fog area line markers; inclusion of smart sensors for traffic control; toll booth control lighting; mobile control signs; traffic light replacement bulb fixture; pedestrian crossing lighting; pedestrian crossing island lighting; road signs (i.e., stop signs, etc.); and road triangles.

The light strip of the present invention also has various automotive applications, such as: truck running lights; truck decorative panels; truck side panel turn indicators; car/truck running board lights; visibility lights for police cars; airplane aisle lighting; train aisle lighting; bus aisle lighting; ship markings; trailer hitch lights; lighting for vehicle docking bays.

In addition, the light strip of the present invention has many structural applications, such as: helicopter pads; well deck indicator lighting; gangway lighting; mobile platform lighting; ladder lighting; night vision lighting; dock lighting; architectural outlining; marina/dock demarkation; passenger control on platforms; theater aisle lighting; restaurant aisle lighting; nightclub lighting; stage and theater guidance lighting; hospital directional guidance lighting; factory demarkation for fork lift loaders; step and entrance lighting; auditorium aisle lighting; swimming pool game lighting; Christmas lighting; toy-implemented lighting; bicycle lighting; sports training device lighting; ski trail lighting; landscape design-related lighting; fountain lighting; antenna lighting; camping lighting; tent lighting; and party canopy lighting.

It should be appreciated that any number of bus wires may be run and any number of rows or configuration of substrate mounted LED circuits may be electrically connected to the bus elements in the process described above.

Further, it should be appreciated that the LED light strip of the present invention is completely impervious to moisture ingress and may therefore be used in certain underwater applications such as for aquarium or pool lighting. Use of such LED light strips could result in savings over current lighting systems.

It should also be appreciated that the LED light strips may be formed in a variety of cross-sectional shapes, such as rectangular, bowed, elliptical or any other desired shape through the above-described process through manipulation of the thermoplastic extruder on the shaping rollers in a manner well known in the art.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

I claim:

1. An integrally formed single piece light strip having no internal voids, comprising:

first and second bus elements spaced apart from one another by a predetermined distance for operative connection to a power source;

a substrate including a printed circuit in electrical contact with said bus elements to conduct electricity thereon; and at least one light emitting diode (LED) including electrical contact prongs, said LED being mounted on the substrate strip with the electrical contact prongs communicating with the printed circuit on said substrate strip;

an extruded plastic material completely encapsulating said first and second bus elements, said substrate strip and said LED to thereby provide a protective barrier; and prong securing means for electrically connecting the LED contact prongs with the printed circuit when said LED contact prongs are crimped into electrical contact with said printed circuit;

said prong securing means comprising an electrical connecting material including a plurality of alternating layers of conductive and non-conductive material, with two of said conductive layers being placed in contact with said printed circuit.

2. An integrally formed light strip system, comprising:

a first integrally formed light strip, comprising:

first and second bus elements spaced apart from one another by a predetermined distance for operative connection to a power source;

a substrate strip including a printed circuit thereon, said substrate strip contacting said first and second bus elements to electrically connect said printed circuit to said bus elements;

at least one light emitting diode (LED) being electrically connected to said printed circuit, said LED being illuminated upon said bus elements conducting electricity; and a plastic material extruded over said first and second bus elements, said substrate strip and said LED to completely encapsulate said first and second bus elements, said substrate strip and said LED to thereby provide a unitary light strip protective barrier, said plastic material being extruded to define a top surface and a bottom surface, with said bottom surface defining a channel therein;

a second integrally formed light strip having a structure and function substantially identical to said first integrally formed light strip; and an electrical connector including channel flanges for reception in said channels of said first and second light strips in a friction fit to electrically connect said first and second light strips.

3. An integrally formed light strip system, comprising:

a first integrally formed light strip, comprising:

first and second bus elements spaced apart from one another by a predetermined distance;

a substrate strip including a printed circuit thereon, said substrate strip contacting said first and second bus elements to electrically connect said printed circuit to said bus elements;

at least one light emitting diode (LED) being electrically connected to said printed circuit, said LED being illuminated upon said bus elements conducting electricity; and a plastic material extruded over said first and second bus elements, said substrate strip and said LED to completely encapsulate said first and second bus elements, said substrate strip and said LED to thereby provide a unitary light strip protective barrier, said plastic material being extruded to define a top surface and a bottom surface, with said bottom surface defining a channel therein; and a second integrally formed light strip having a structure and function substantially identical to said first integrally formed light strip;

said extruded plastic material being extruded to form an outer protective barrier having substantially ⅜ inch square dimensions.

4. A light strip, comprising:

first and second bus elements spaced apart from one another by a predetermined distance for operative connection to a power source;

a flexible substrate strip including a top surface and a bottom surface, said flexible substrate having a printed circuit and electrical contact with said bus elements to conduct electricity thereon, and at least one light emitting diode (LED) including electrical contact prongs and electrical contact with the printed circuit, said contact prongs are crimped into contact with said printed circuit;

a plastic material extruded about said first and second bus elements, said flexible substrate, and said at least one light emitting diode for substantially encapsulating said first and second bus elements, said flexible substrate and said at least one LED for providing a unitary seamless protective barrier;

prong-securing means for electrically connecting the LED contact prongs with said printed circuit wherein said prong securing means comprises an electrical connecting material including a plurality of alternating layers of conductive and non-conductive material, with two of said conductive layers being placed in contact with said printed circuit; and whereby said light strip is intrically formed as a single piece.

5. A light strip, comprising:

first and second bus elements spaced apart from one another by a predetermined distance for operative connection to a power source;

a flexible substrate strip including a printed circuit and at least one light emitting diode (LED) electrically connected to said printed circuit that is illuminated upon said bus elements conducting electricity, said flexible substrate strip contacting said first and second bus elements to electrically connect said printed circuit to said bus elements;

a plastic material extruded about said first and second bus elements, said flexible substrate strip and said at least one LED to completely encapsulate said first and second bus elements, said flexible substrate strip and said at least one LED for providing a unitary seamless light strip protective barrier, said plastic material being extruded to define a top surface and a bottom surface, with said bottom surface defining a channel therein;

whereby said light strip is integrally formed as a single piece;

a second integrally formed light strip electrically connected to said first integrally formed light strip, said second integrally formed light strip including:

first and second bus elements spaced from one another by a predetermined distance for operative connection to a power source;

a flexible substrate including a printed circuit thereon, said flexible substrate strip connecting said first and second bus elements to electrically connect said printed circuit to said bus elements;

at least one light emitting diode (LED) being electrically connected to said printed circuit, said LED being illuminated upon said bus elements conducting electricity;

a plastic material extruded over said first and second bus elements, said flexible substrate and said LED to completely encapsulate said first and second bus elements, said flexible substrate strip and said LED to provide a unitary light strip protective barrier, said plastic material being extruded to define a top surface on the bottom surface with said bottom surface defining a channel therein; and an electrical connector including channel flanges for reception in said channel of said first and second light strips in a friction fit to facilitate electrical connection of said first and second light strips.

6. The light strip of claim 5, wherein said electrical connector includes upwardly-extending posts for engaging bores formed in said channels of said and first and second integrally formed light strips.

7. A light strip, comprising:

first and second bus elements spaced apart from one another by a predetermined distance for operative connection to a power source;

a flexible substrate strip including a printed circuit and at least one light emitting diode (LED) electrically connected to said printed circuit that is illuminated upon said bus elements conducting electricity, said flexible substrate strip contacting said first and second bus elements to electrically connect said printed circuit to said bus elements;

a plastic material extruded about said first and second bus elements, said flexible substrate strip and said at least one LED to completely encapsulate said first and second bus elements, said flexible substrate strip and said at least one LED for providing a unitary seamless light strip protective barrier, said plastic material being extruded to define a top surface and a bottom surface, with said bottom surface defining a channel therein;

whereby said light strip is integrally formed as a single piece;

a second integrally formed light strip electrically connected to said first integrally formed light strip, said second integrally formed light strip including:

first and second bus elements spaced from one another by a predetermined distance for operative connection to a power source;

a flexible substrate including a printed circuit thereon, said flexible substrate strip connecting said first and second bus elements to electrically connect said printed circuit to said bus elements;

at least one light emitting diode (LED) being electrically connected to said printed circuit, said LED being illuminated upon said bus elements conducting electricity; and a plastic material extruded over said first and second bus elements, said flexible substrate and said LED to completely encapsulate said first and second bus elements, said flexible substrate strip and said LED to provide a unitary light strip protective barrier, said plastic material being extruded to define a top surface on the bottom surface with said bottom surface defining a channel therein, said plastic material of said first and second light strips is extruded to form an outer protective barrier having substantially $\tfrac{3}{8}$ inch square dimensions.

* * * * *